United States Patent
Narusawa et al.

[11] Patent Number: 5,818,211
[45] Date of Patent: Oct. 6, 1998

[54] CURRENT GENERATING CIRCUIT FOR READ/WRITE HEAD

[75] Inventors: Keiji Narusawa, Kanagawa; Michiya Sako, Kagoshima, both of Japan

[73] Assignee: Sony Corporation, Japan

[21] Appl. No.: 808,691

[22] Filed: Feb. 28, 1997

[30] Foreign Application Priority Data

Mar. 22, 1996 [JP] Japan .................................... 8-066040

[51] Int. Cl.⁶ ...................................................... G05F 3/20
[52] U.S. Cl. ............................................ 323/312; 323/315
[58] Field of Search .................................... 323/312, 315, 323/316; 327/538, 561

[56] References Cited

U.S. PATENT DOCUMENTS

| | | | |
|---|---|---|---|
| 3,683,270 | 8/1972 | Mattis | 323/351 |
| 4,127,783 | 11/1978 | Alaspa | 327/538 |
| 4,563,632 | 1/1986 | Palara et al. | 323/316 |
| 4,603,290 | 7/1986 | Shinomiya | 323/315 |
| 5,391,979 | 2/1995 | Kajimoto et al. | 323/313 |
| 5,517,103 | 5/1996 | Ng et al. | 323/315 |

*Primary Examiner*—Adolf Berhane
*Attorney, Agent, or Firm*—Ronald P. Kananen

[57] ABSTRACT

A current generating circuit which has a current source, two switches connected in serial between one of the output terminals and a first or second transistor, and a control signal generating circuit that generates a control signal for operating the first and second transistors out of phase. A write current is generated between the output terminals by direct switching of a current supplied to the first and second transistors by the two switches. The dynamic range of the output voltage for a magnetic head in a recording apparatus connected to the output terminals can be made large, and the rising and falling times of the write current can be shortened to result in an improved high speed recording.

6 Claims, 7 Drawing Sheets

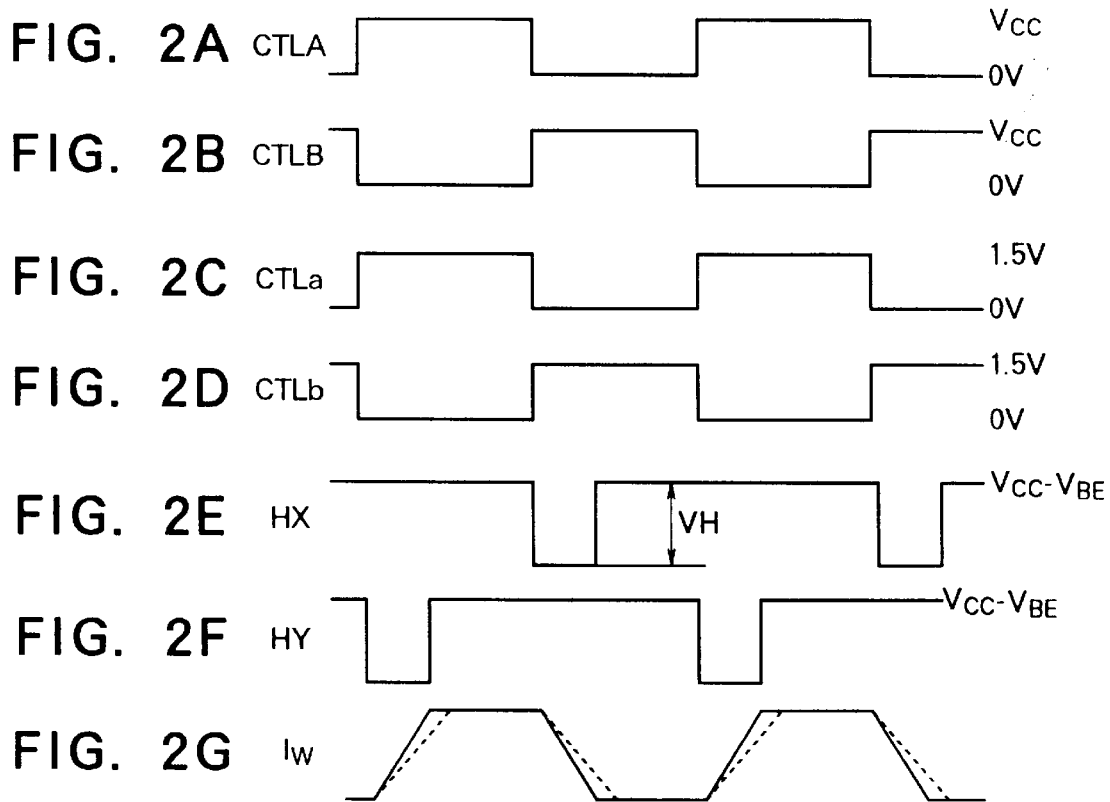
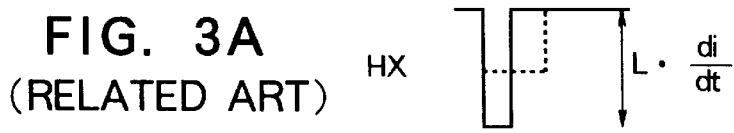
FIG. 3A
(RELATED ART)
FIG. 3B
(RELATED ART)

CURRENT GENERATING CIRCUIT FOR READ/WRITE HEAD

BACKGROUND OF THE INVENTION

1. Field of the Invention

The present invention relates to a current generating circuit for supplying a current to, for example, a read/write head used for a hard disk drive (HDD).

2. Description of the Related Art

FIG. 1 is a circuit diagram of an example of a current generating circuit for a read/write head in the related art, which may be built in an integrated circuit (IC) for a HDD, and FIGS. 2A to 2G are timing charts of the same.

As shown in FIG. 1, a current generating circuit 1 contains by NPN type transistors Q1 to Q6, resistance elements R1 and R2, and a current source Ie1 and drives a coil LHD of a magnetic head.

Collectors of the transistor Q1 and Q2 are connected to a supply line of a power source voltage $V_{cc}$ ($V_{CC}$ supply line), an emitter of the transistor Q3 is connected to a collector of the transistor Q3, a connection point HX is connected to one side of the coil LHD. An emitter of the transistor Q2 is connected to a collector of the transistor Q4, while a connection point HY is connected to another side of the coil LHD. Emitters of the transistors Q3 and Q4 are connected to a collector of the transistor Q5, while an emitter of the transistor Q5 is connected to a ground line via the resistance element R1. A base of the transistor Q5 is connected to a base and a collector of the transistor Q6, the connection point of them is connected to the current source Ie1, and an emitter of the transistor Q6 is connected to the ground line via the resistance element R2.

Note that, a current mirror circuit is constructed by the transistors Q5 and Q6. A stable constant current source is formed by the current source Ie1, the transistors Q5 and Q6, and the resistance elements R1 and R2.

Signals CTLA, CTLa, CTLB and CTLb shown in the FIGS. 2A, 2C, 2B and 2D are supplied to the bases of the transistors Q1 to Q4.

Concretely, the signal CTLA is supplied to the base of the transistor Q1, the signal CTLa which has a phase as same as that of the signal CTLA is supplied to the base of the transistor Q4, the signal CTLB which has an inversion phase to those of the signals CTLA and CTLa is supplied to the base of the transistor Q2, and the signal CTLb which has a same phase to that of the signal CTLB is supplied to the base of the transistor Q3.

When the signals CTLA and CTLa are at a high level and the signals CTLB and CTLb are at a low level, the transistors Q1 and Q4 are kept in turn-on state and the transistors Q2 and Q3 are kept in turn-off state, therefore a write current Iw flows from one side (HX) to another side (HY) of the coil LHD.

Contrary, when the signals CTLB and CTLb are at a high level and the signals CTLA and CTLa are at a low level, the transistors Q2 and Q3 are kept in turn-on state and the transistors Q1 and Q4 are kept in turn-off state, therefore the write current Iw flows from another side (HY) to one side (HX) of the coil LHD.

This current switching operation as mentioned above is performed at predetermined time intervals in response to the levels of the signals CTLA, CTLa, CTLB and CTLb. A disc recording medium is magnetized by the coil LHD of the head in response to the above switching operation to show predetermined magnetic field directions.

The value of the write current Iw will be determined by a size ratio of transistors Q5 and Q6 which form the current mirror circuit, for example, when the size ratio is 1:1, then I1=Iw.

In the circuit shown in FIG. 1, the write current Iw is generated as a collector current of the transistor Q5, and the direction of current flow thereof is reversely changed by the operation of the transistors Q3 and Q4.

Note, in the circuit described above, the maximum value Vmax and the minimum value Vmin of a voltage amplitude VH applied to the coil LHD are expressed by the following formulas:

$$\begin{aligned} Vmax &= V_{CC} - V_{RE(Q1,Q2)} \\ Vmin &= Iw \times RV1 + V_{CE(Q5)} + V_{CE(Q3,Q4)} \\ &= 0.2V + 0.5V + 0.5V \\ &= 1.2V \end{aligned} \qquad (1)$$

Where, RV1 denotes a resistance value of the resistance element R1, $V_{BE}$ denotes a base-to-emitter voltage, $V_{BE}$=0.5 V, and $V_{CE}$ denotes a collector-to-emitter voltage, $V_{CE}$=0.5 V.

When the power source voltage $V_{cc}$ is 5 V and $V_{BE}$ is 0.8 V, the voltage amplitude VH will be 3 V as shown below;

$$\begin{aligned} VH &= 4.2V - 1.2V \\ &= 3V \end{aligned}$$

Theoretically, the generated voltage between the two sides of the coil LHD is defined as L(di/dt), but actually the coil LHD includes a resistance element, so if the voltage amplitude VH is small, as shown in FIG. 2G and FIGS. 3A and 3B, the rising and falling times of the write current Iw will be retarded (delayed). Here, (di/dt) is a current changing value with time of the transistors Q3 and Q4 when the coil LHD is not connected to the circuit.

Due to the above delay, it suffers from the disadvantage that a high speed recording is difficult in an HDD recording operation.

In the above description, as an example, a current generating circuit for the head of an HDD was discussed, but the above disadvantage may occur in other fields utilizing such a current generating circuit as well.

SUMMARY OF THE INVENTION

An object of the invention is to provide a current generating circuit enabling a generation of a large amplitude of a voltage supplied to a load such as a magnetic head, and a high frequency operation thereof.

According to the present invention, there is provided a current generating circuit that supplies a current to a magnetic head which generates a magnetic field according to a direction of the supplied current to write data on a recording medium, the current generating circuit, comprising a first switching element which switches between a conductive state (on state) and a non-conductive state (off state) between the head and a first power supply in response to the level of a first control signal; a second switching element which switches between a conductive state and a non-conductive state between the head and the first power supply, at an inversed-phase timing to the first switching element in response to the level of a second control signal; a first current source connected to one side of the head; a second current source connected to another side of the head; and a switching circuit which makes the second current source operate and the first current source hold a non-operation state when the one side of the head and the first power supply are connected by the first switching element and makes the first current source operate and the second current source hold a non-operation state when the other side of the head and first power supply are connected by the second switching element.

In the current generating circuit according to the present invention, one side of the head and the first power supply are held in an operation state by the first switching element based on the first control signal, and another side of the head and the power supply are held a non-operation state by the second switching element based on the second control signal. At this time, the second current source is held in an operation state, and a write current flows from the other side to one side of the head.

Since the write current is generated by directly switching the current source as mentioned above, the amplitude of the voltage applied to the head becomes large and the rising and falling times of the write current is shortened. As a result, for example, the write frequency of the HDD recording operation can be made higher and a high speed recording operation can be achieved.

BRIEF DESCRIPTION OF THE DRAWINGS

The above and other objects and features of the present invention will be explained in further detail with reference to the accompanying drawings, in which:

FIGS. 2A to 2G are timing charts of the circuit shown in FIG. 1;

FIGS. 3A and 3B are waveform diagrams of a head voltage and a write current in the circuit shown in FIG. 1;

DESCRIPTION OF THE PREFERRED EMBODIMENTS

Below, an explanation will be made of the preferred embodiments with reference to the drawings.

Figure 1:
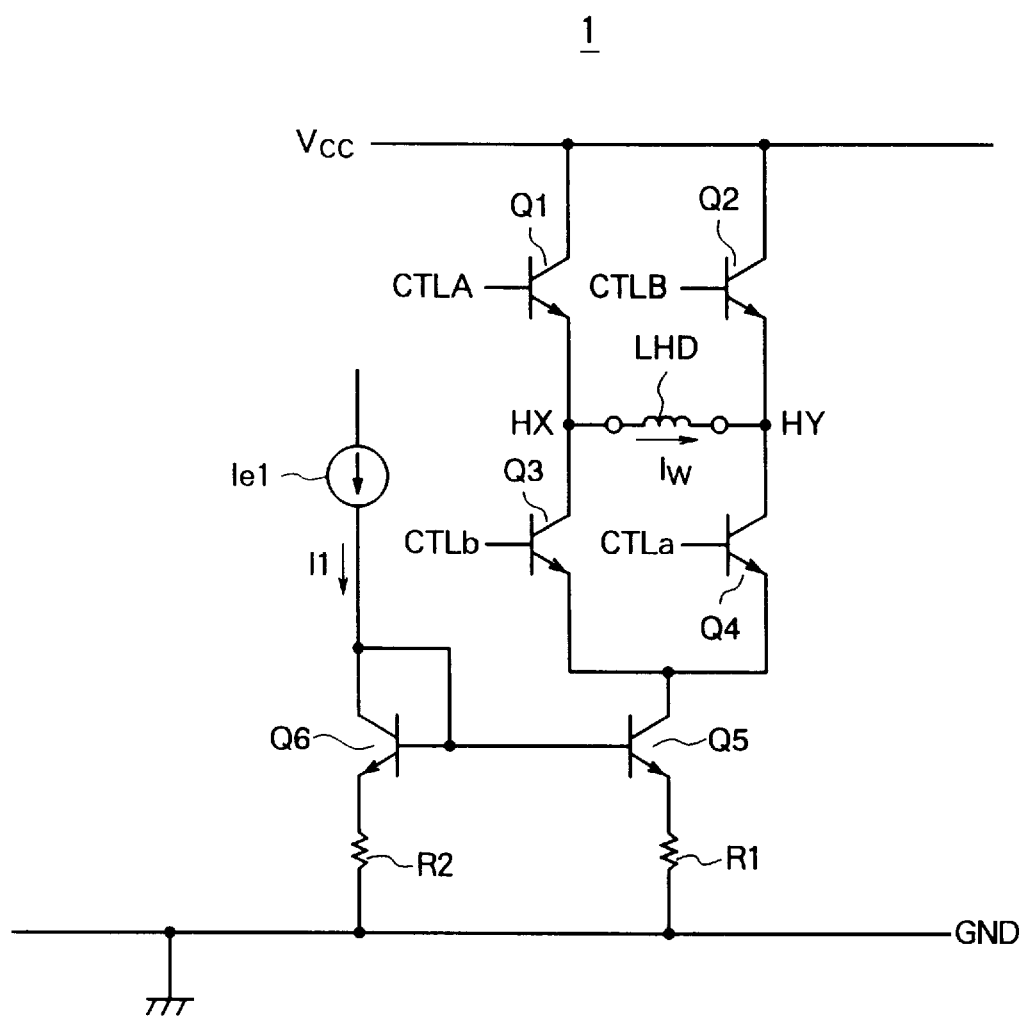
FIG. 1 is a circuit diagram of a current generating circuit for a read/write head of the related art.
Figure 4:
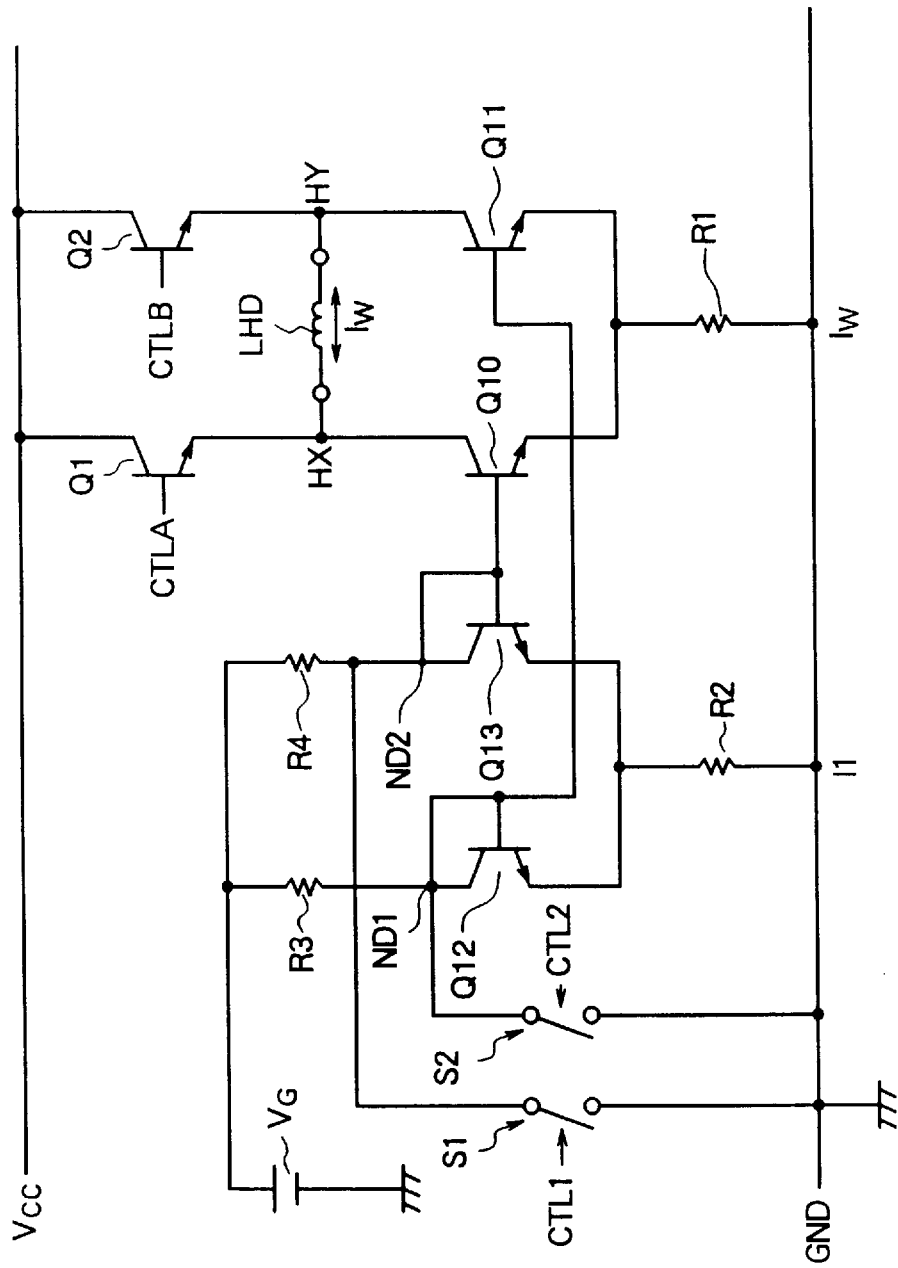
FIG. 4 is a circuit diagram of a current generating circuit for a read/write head according to a first embodiment of the present invention.
Figure 5:
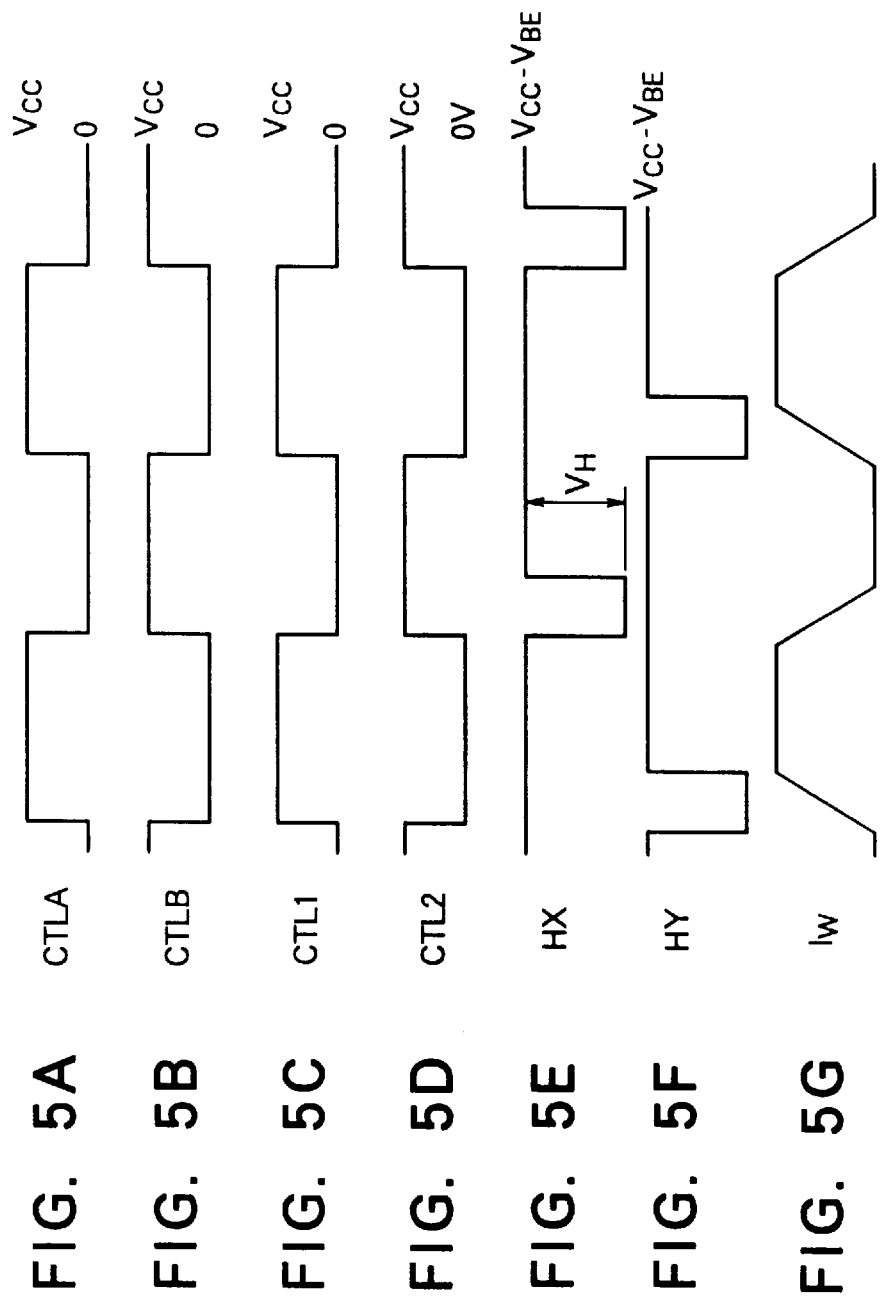
FIGS. 5A to 5G are timing charts of the circuit shown in FIG. 4.

FIG. 4 is a circuit diagram of a current generating circuit for a read/write head according to a first embodiment of the present invention. Symbols and/or numerals in FIG. 4 which are the same as those in FIG. 1 showing the related art indicate the same elements and/or components.

A current generating circuit 10 for a read/write head of the first embodiment is constituted by transistors Q1, Q2 and Q10 to Q13, resistance elements R1 to R4, a coil LHD of a read/write head, a constant-voltage source VG, and switching circuits S1 and S2.

Collectors of the transistors Q1 and Q2 are connected to a supply line of a power source voltage $V_{CC}$ ($V_{CC}$ supply line), an emitter of the transistor Q1 is connected to a collector of the transistor Q10, and the connection point HX is connected to one side of the coil LHD. An emitter of the transistor Q2 is connected to a collector of the transistor Q11, and the connection point HY is connected to another side of the coil LHD. Emitters of the transistors Q10 and Q11 are connected with each other, and the connection point is connected to the ground line GND via the resistance element R1.

Further, a base of the transistor Q10 is connected to a base and a collector of the transistor Q13, and the connection point ND2 is connected to the constant-voltage source VG via the resistance element R4 and the switching circuit S1 directly. A base of the transistor Q11 is connected to a base and a collector of the transistor Q12, and the connection point ND1 is connected to the constant-voltage source VG via the resistance element R3 and the switching circuit S2 directly. Emitters of transistors Q12 and Q13 are connected with each other, and the connection point is connected to the ground line GND via the resistance element R2.

Note that, a current mirror circuit is constricted by the transistors Q12 and Q11 or the transistors Q13 and Q10. The state of connection or disconnection between the connection point ND2 and the ground line GND is defined by the operation of the switching circuit S1 according to the level of a control signal CTL1. More particularly, the connection point ND2 and the ground line GND are kept in a state of connection when the control signal CTL1 is a high level and kept in a state of disconnection when the control signal CTL1 is a low level. Similarly, the state of connection or disconnection between the connection point ND1 and the ground line GND is defined by the operation of the switching circuit S2 according to the level of a control signal CTL2. Specifically, the connection point ND1 and the ground line GND are kept in a state of connection when the control signal CTL2 is a high level and kept in a state of disconnection when the control signal CTL2 is a low level. As shown in the timing charts of FIGS. 5A to 5G, the control signal CTL1 is an in-phase signal with the signal CTLA supplied to the base of the transistor Q1, while the control signal CTL2 is an in-phase signal with the signal CTLB supplied to the base of the transistor Q2.

Next, an explanation will be made of the operation of the circuit mentioned above.

When the signals CTLA and CTL1 are supplied at a high level and the signals CTLB and CTL2 are supplied at a low level, the transistor Q1 and the switching circuit S1 are held in the turn-on state, and the transistor Q2 and the switching circuit S2 are held in the turn-off state. By the conductive state of the switching circuit S1, a current flowing via the resistance element R4 is caused to flow to the ground line GND via the switching circuit S1. As a result, the current mirror circuit consisting of the transistors Q13 and Q10 does not function as a current source. On the other hand, because the switching circuit S2 is held in the non-conductive state, a current flowing via the resistance element R3 is caused to flow to the collector and the base of the transistor Q12 and the base of the transistor Q11. As a result, the current mirror circuit consisting of the transistor Q12 and Q11 functions as a current source. Accordingly, in this case, the write current Iw flows from one side (HX) to another side (HY) of the coil LHD.

Note that, the current I1 of the current mirror circuit in this case is expressed by the following formula:

$$I1 = (VG - V_{BE(Q12)})/(RV3 + RV2) \quad (2)$$

Where, RV3 denotes the resistance value of the resistance element R3, and RV2 denotes the resistance value of the resistance element R2. When the size ratio of the transistors Q12 and Q11 is 1:1, I1=Iw.

In the circuit described above, the maximum value Vmax and the minimum value Vmin of a voltage amplitude VH applied to the coil LHD are expressed by the following formulas:

$$Vmax = V_{CC} - V_{BE(Q1)} \quad (3)$$
$$Vmin = Iw \times RV1 + V_{CE(Q11)}$$
$$= 0.2V + 0.5V$$
$$= 0.7V$$

When the power source voltage $V_{CC}$ is 5 V and $V_{BE}$ is 0.8 V, the voltage amplitude VH will be as follows:

$$VH = 4.2V - 0.7V$$
$$= 3.5V$$

This value is improved by 0.5 V comparing with the value 3 V of the related art circuit.

On the other hand, when the signals CTLA and CTL1 are supplied at a low level and when the signals CTLB and CTL2 are supplied at a high level, the transistor Q2 and the switching circuit S2 are held at the turn-on state, and the transistor Q1 and the switching circuit S1 are held on the turn-off state. Due to the conductive state of the switching circuit S2, the current flowing via the resistance element R3 is caused to flow to the ground line GND via the switching circuit S2. As a result, the current mirror circuit consisting of the transistors Q12 and Q11 does not function as a current source. On the other hand, because the switching circuit S1 is held at the non-conductive state, the current flowing via the resistance element R4 is caused to flow to the collector and the base of the transistor Q13 and the base of the transistor Q10. As a result, the current mirror circuit consisting of the transistor Q13 and Q10 functions as a current source. Accordingly, in this case, the write current Iw flows from the side (HY) to the side (HX) of the coil LHD.

Note that, the current I1 of the current mirror circuit in this case is expressed by the following formula:

$$I1 = (VG - V_{BE(Q)})/(RV4 + RV2) \quad (4)$$

Where, RV4 denotes resistance value of the resistance element R4. When the size ratio of the transistors Q13 and Q10 is 1:1, I1=Iw.

In this case too, the maximum value Vmax and the minimum value Vmin of the voltage amplitude VH of the voltage applied to the coil LHD are expressed by the following formulas:

$$Vmax = V_{CC} - V_{BE(Q2)} \quad (5)$$
$$Vmin = Iw \times RV1 + V_{CE(Q10)}$$
$$= 0.2V + 0.5V$$
$$= 0.7V$$

Here, when the power source voltage $V_{CC}$ is 5 V and $V_{BE}$ is 0.8 V, the voltage amplitude VH will be as follows:

$$VH = 4.2V - 0.7V$$
$$= 3.5V$$

This value is improved by 0.5 V comparing with the value 3 V of the related art circuit.

This current switching operation is performed at the predetermined time intervals in response to the levels of the signals CTLA, CTLa, CTLB, and CTLb. A disc recording medium is magnetized in response to the above switching operation to show predetermined magnetic field directions.

As explained above, according to the first embodiment, the voltage amplitude VH becomes large, therefore the rising and falling time of the write current Iw can be shortened. As a result, the write frequency at the HDD recording operation can be made higher and a high speed recording operation can be achieved.

Next, an explanation will be made of a second embodiment. In the formulas (1) and (4) giving the values of the current I1 of the first embodiment, a temperature dependence base-to-emitter voltage $V_{BE}$ of the transistor was unchecked.

Figure 6:
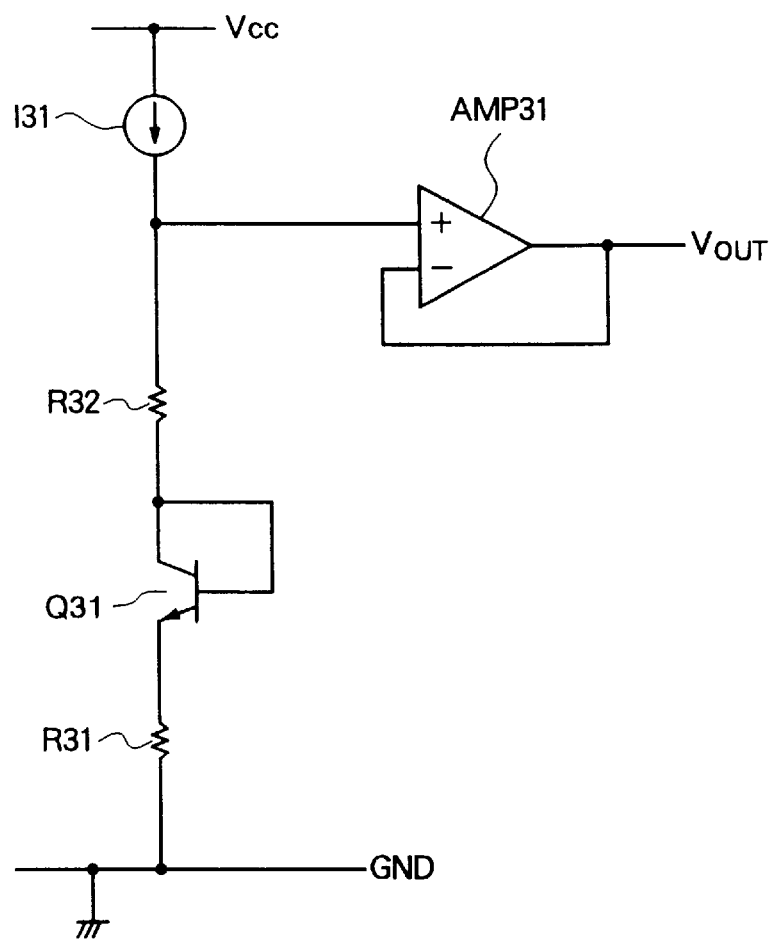
FIG. 6 is a circuit diagram of a second embodiment of the present invention, which functions as a constant-voltage source in the circuit shown in FIG. 4.

By constructing a constant-voltage source VG like a circuit shown as FIG. 6 for example, it becomes possible to generate the write current Iw without fluctuation (variation) caused by the temperature dependency of $V_{BE}$ or manufacturing variances.

As shown in FIG. 6, the constant-voltage source VG of the second embodiment contains a constant-current source I31, an operational amplifier AMP31, an NPN type transistor Q31, and resistance elements R31 and R32.

In the constant-voltage source VG, an emitter of the transistor Q31 is connected to the ground line GND via the resistance element R31, a collector thereof is connected to the constant-current source I31 via the resistance element R32, and a connection point of the I31 side is connected to a non-inverted input terminal (+) of the operational amplifier AMP31. An output terminal of the operational amplifier AMP31 is connected to an inverted input terminal (−) of the same.

In the constant-voltage source VG of the above circuit configuration, a constant-voltage at an output terminal Vout kept at a predetermined voltage level is obtained based on a current dependent on $V_{BE}$ of the transistor Q31. Therefore, the effect of the base-to-emitter voltage $V_{BE}$ which is dependent on the operation temperature and the variances in the transistors Q12 and Q13 constituting the current mirror circuit of FIG. 4 can be cancelled out between the current mirror circuit and the constant-voltage source VG. As a result, a write current Iw which is not changed due to the temperature dependency or variances in transistors can be generated.

Figure 7:
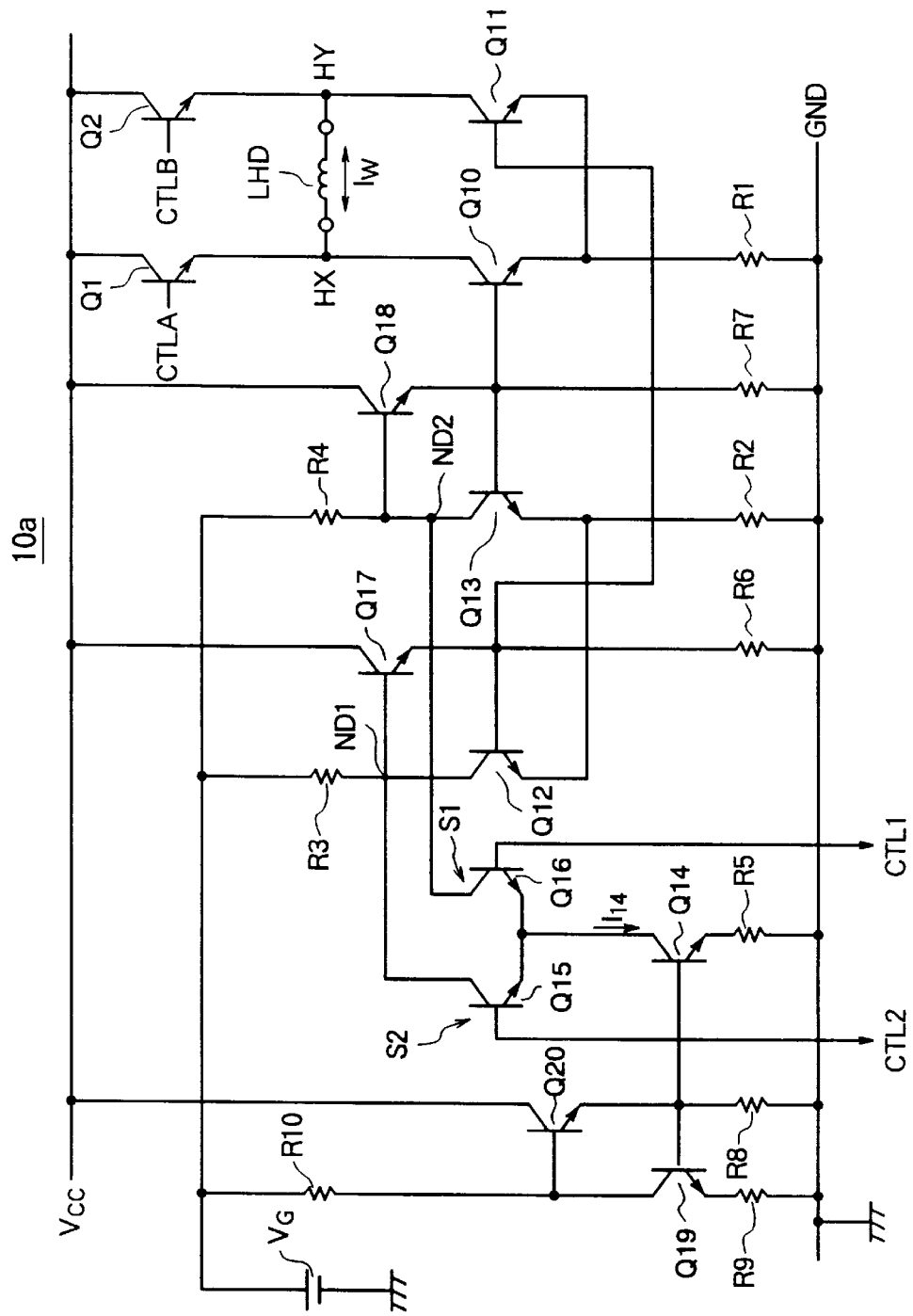
FIG. 7 is a circuit diagram of a current generating circuit for a read/write head according to a third embodiment of the present invention.

Next, an explanation will be made of a third embodiment. FIG. 7 is a circuit diagram of a current generating circuit for a read/write head according to the third embodiment of the present invention.

The differences between the third embodiment and the first embodiment are that, in the switching circuit part, a current proportional to the write current Iw is generated from the constant-voltage source VG as a collector current I14 of a transistor Q14 and the current I14 is switched in current path by a differential switching circuit consisting of the two transistors Q15 and Q16 to alternatively lower the potentials of the nodes ND1 and ND2 and that the current mirror circuit was made a so-called $h_{FE}$ compensated type circuit by adding the transistors Q17 and Q18 instead of a so-called short type circuit that directly shorts the collector and base of the transistors Q12 and Q13.

Specifically, an emitter of the transistor Q14 is connected to the ground line GND via a resistance element R5, and a collector of the transistor Q14 is connected to the two emitters of the transistors Q15 and Q16. Then, a signal CTL2 is supplied at a base of the transistor Q15, and a signal CTL1 is supplied at a base of the transistor Q16. A collector of the transistor Q15 is connected to the node ND1, and the node ND1 is connected to a base of a transistor Q17. A collector of the transistor Q17 is connected to the $V_{CC}$ supply line, an emitter of the same is connected to the base of the transistors Q12 and Q11, and the connection point is connected to the ground line GND via a resistance element R6. A collector of the transistor Q16 is connected to the node ND2, and the node ND2 is connected to a base of a transistor Q18. A collector of the transistor Q18 is connected to the $V_{CC}$ supply line, an emitter of the same is connected to the bases of the transistors Q13 and Q10, and the connection point is connected to the ground line GND via a resistance element R7. Further, a base of the transistor Q14 is connected to a base of a transistor Q19 and an emitter of a transistor Q20, and the connection point is connected to the ground line GND via a resistance element R8. An emitter of the transistor Q19 is connected to the ground line GND via a resistance element R9, a collector of the same is connected to a base of the transistor Q20, the connection point is connected to the constant-voltage source VG via a resistance element R10, and a collector of the transistor Q20 is connected to the $V_{CC}$ supply line.

In the circuit explained above, a constant-current generated at the resistance element R10 appears as a collector current I14 of the transistor Q14 by the $h_{FE}$ compensated type current mirror circuit consisting of the transistors Q19, Q20, and Q14. Then, signals CTL1 and CTL2, the phases of which are inverted with respect to each other, are supplied to the bases of the transistors Q15 and Q16 that constitute the differential switching circuit.

When the signal CTL1 is supplied to the base of the transistor Q1 at a high level and the signal CTL2 is supplied to the base of the transistor Q2 at a low level, a current flows to the transistor Q16 side of the differential switching circuit. Therefore, the potential of the node ND2 falls, and the transistor Q18 is held in the turn-off state. Accordingly, the current mirror circuit consisting of the transistors Q13, Q18 and Q10, does not function as a current source.

On the other hand, the potential of node ND1 is held at a predetermined voltage level and the transistor Q17 is held in the turn-on state. As a result, the current mirror circuit consisting of the transistors Q12, Q17, and Q11 functions as a current source. Then, the write current Iw flows from one side (HX) to another side (HY) of the coil LHD. Note that, in this case, the maximum value Vmax and the minimum value Vmin of the voltage amplitude VH of the voltage applied to the coil LHD are expressed by the formulas (3). Accordingly, when the power source voltage $V_{CC}$ is 5 V and $V_{BE}$ is 0.8 V, the voltage amplitude VH becomes 3.5 V, which is improved by 0.5 V comparing with the value 3 V of the related art circuit.

On the other hand, when the signals CTLA and CTL1 are supplied at a low level and the signals CTLB and CTL2 are supplied at a high level, because a current flows on the transistor Q15 side of the differential switching circuit, the potential of the node ND1 falls and the transistor Q17 is held in the turn-off state. Accordingly, the current mirror circuit consisting of the transistors Q12, Q17, and Q11 does not function as a current source.

Contrary to this, the potential of the node ND2 is held at a predetermined voltage level, and the transistor Q18 is held in the turn-on state. As a result, the current mirror circuit consisting of the transistors Q13, Q18, and Q10 functions as a current source. Accordingly, the write current Iw flows from the side (HY) to the side (HX) of the coil LHD. Note that, in this case too, the maximum value Vmax and the minimum value Vmin of the voltage amplitude VH of the voltage applied to the coil LHD are expressed by the formulas (5). Accordingly, when the power source voltage $V_{CC}$ is 5 V and $V_{BE}$ is 0.8 V, the voltage amplitude VH becomes 3.5 V, which is improved by 0.5 V comparing with the value 3 V of the related art circuit.

This current switching operation as mentioned above is performed at predetermined time intervals in response to the levels of the signals CTLA, CTLa, CTLB, and CTLb. A disc recording medium is magnetized in response to the above switching operation to show predetermined magnetic field directions.

Next, an explanation will be made of a fourth embodiment.

In the case of the third embodiment, the formula of the current generated by the current source included a term based on the transistor's base-to-emitter voltage $V_{BE}$ which was dependent on the operation temperature as in the case of the first embodiment mentioned before. In the fourth embodiment, the constant-voltage source VG is constituted by a circuit shown in FIG. 8 for example, so the write current Iw can be generated without being affected by the temperature dependency of $V_{BE}$ or variances in the transistors.

Figure 8:
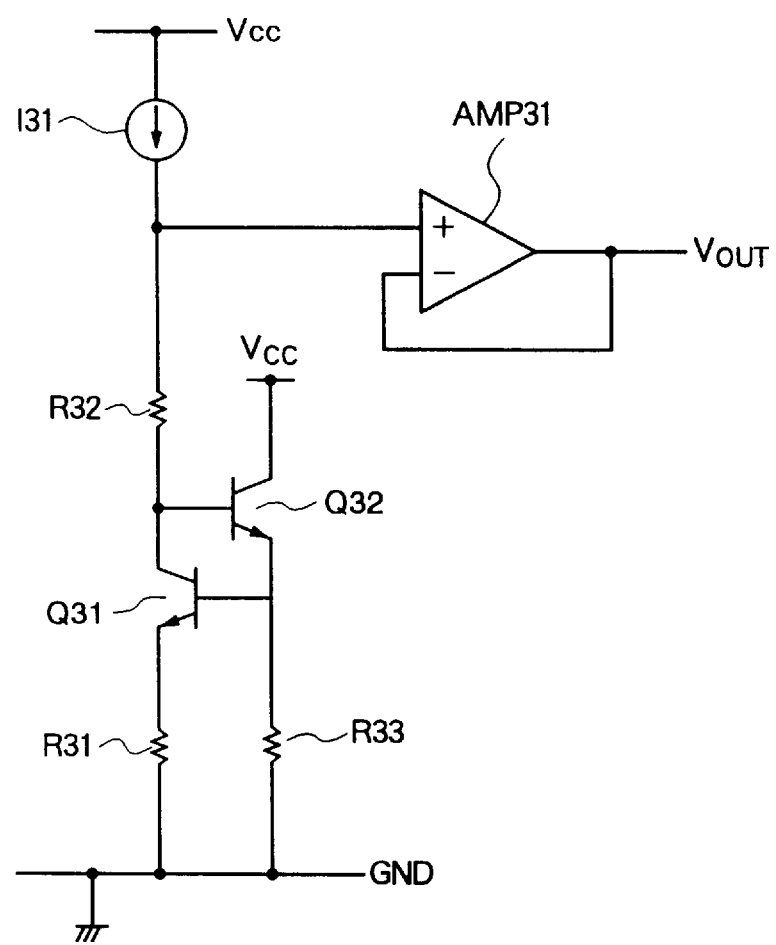
FIG. 8 is a circuit diagram of a fourth embodiment of the present invention, which functions as a constant-voltage source in the circuit shown in FIG. 6.

As shown in FIG. 8, the constant-voltage source VG is constituted by a constant-current source I31, an operational amplifier AMP31, NPN type transistors Q31 and Q32, and resistance elements R31 to R33.

In the constant-voltage source VG, an emitter of the transistor Q31 is connected to the ground line GND via the resistance element R31, a collector of the same is connected to a base of the transistor Q32, the connection point is connected to the constant-current source I31 via the resistance element R32, and the connection point of the I31 side is connected to a non-inverted input terminal (+) of the operational amplifier AMP31. A collector of the transistor Q32 is connected to the $V_{CC}$ supply line, an emitter of the same is connected to a base of the transistor Q31, and the connection point is connected to the ground line GND via the resistance element R33. Then, an output terminal Vout of the operational amplifier AMP31 is connected to an inverted input terminal (−).

In the constant-voltage source VG of the above circuit configuration, the obtained constant-voltage at the output terminal Vout is kept at a predetermined voltage level based on a current dependent on the $V_{BE}$ of the transistors Q31 and Q32. Therefore, the effect of the base-to-emitter voltage $V_{BE}$ which is dependent on the operation temperature and the variances in the transistors Q12 and Q17 or transistors Q13 and Q18 constituting the current mirror circuit in FIG. 7 can be cancelled out between the current mirror circuit and the constant-voltage source VG. As a result, a write current Iw which does not fluctuate due to the temperature dependency or variances in transistors can be generated.

Namely, in the fourth embodiment, good results the same as in the second embodiment can be achieved.

In the above embodiments, current generating circuits for the head of an HDD were discussed. The current generating circuit of the present invention, however, can be extensively used to drive other device which includes inductance, for example, a voice coil motor.

As explained above, in the present invention, the voltage amplitude becomes large, therefore the write frequency at the recording operation can be made higher and a high speed recording operation can be achieved.

What is claimed is:

1. A current generating circuit that supplies a current to a magnetic head which generates a magnetic field for a recording medium, said current generating circuit comprising:

a first switching element that switches between a conductive state and a non-conductive state between a first side of said magnetic head and a first power supply in response to a first control signal;

a second switching element that switches between a conductive state and a non-conductive state between said first side of said magnetic head and the first power supply in a manner opposite to said switching of said first switching element;

a first current source connected to a first side of said magnetic head;

a second current source connected to a second side of said magnetic head;

a switching circuit that makes said second current source operate and said first current source hold a non-operation state when said first side of the magnetic head and said first power supply are connected by said first switching element, and that makes said first current source operate and said second current source hold a non-operation state when said second side of the magnetic head and said first power supply are connected by said second switching element.

2. A current generating circuit according to claim 1, wherein said first current source and said second current source are each formed by a current mirror circuit including at least two transistors.

3. A current generating circuit according to claim 2, wherein said first current source is formed by a first current mirror circuit, said first current mirror circuit comprising:

a first transistor connected to said first side of said magnetic head and an emitter connected to a second power supply, and a second transistor with a collector and a base connected to each other at a first connection point, the first connection point being connected to a base of said first transistor and a third power supply, and an emitter connected to said second power supply;

wherein said second current source is formed by a second current mirror circuit, said second current mirror circuit comprising:

a third transistor with a collector connected to said second side of said magnetic head and an emitter connected to the second power supply, and a first transistor with a collector and a base connected to each other at a second connection point, the second connection point being connected to a base of said third transistor and the third power supply, and an emitter connected to said second power supply;

and wherein said switching circuit switches between connecting said second power supply to the collector of said second transistor and connecting said second power supply to the collector of said fourth transistor to control the operation or the non-operation of said first and second current sources.

4. A current generating circuit according to claim 2, wherein said first current source is formed by a first current mirror circuit, said first current mirror comprising:

a first transistor with a collector connected to said first side of said magnetic head and an emitter connected to the second power supply;

a second transistor with a collector connected to the third power supply, an emitter connected to the second power supply, and a base connected to a base of said first transistor; and a third transistor with a collector connected to said first power supply, an emitter connected to a base of said second transistor, and a base connected to the collector of said second transistor;

wherein said second current source is formed by a second current mirror circuit, said second current mirror circuit comprising;

a fourth transistor with a collector connected to said second side of said magnetic head and an emitter connected to the second power supply;

a fifth transistor with a collector connected to the third power supply, an emitter connected to the second power supply, and a base connected to a base of said fourth transistor; and a sixth transistor with a collector connected to said first power supply, an emitter connected to a base of said second transistor, and a base connected to the collector of said fifth transistor;

and wherein said switching circuit switches between connecting said second power supply to the collector of said second transistor and connecting said second power supply to the collector of said fifth transistor to control the operation and the non-operation of said first and second current sources.

5. A current generating circuit according to claim 3, wherein said third power supply includes a transistor that is the same as said second transistor of the first current mirror circuit or that is the same as said fourth transistor of the second current mirror circuit and wherein said third power supply supplies a voltage dependent on the characteristics of said second or said fourth transistor.

6. A current generating circuit according to claim 4, wherein said third power supply includes two transistors connected in the same manner as said second and third transistors of said first current mirror circuit or in the same manner as said fifth and sixth transistors of said second current mirror circuit, and wherein said third power supply supplies a voltage dependent on the characteristics of said second and third transistors or said fifth and sixth transistors.

* * * * *

UNITED STATES PATENT AND TRADEMARK OFFICE
CERTIFICATE OF CORRECTION

PATENT NO. : 5,818,211 Page 1 of 1
APPLICATION NO. : 08/8808691
DATED : October 6, 1998
INVENTOR(S) : Keiji Narusawa It is certified that error appears in the above-identified patent and that said Letters Patent is hereby corrected as shown below:

Column 9:
Line 5, "first side" should read -- second side --.

Signed and Sealed this

Twenty-ninth Day of August, 2006

JON W. DUDAS
*Director of the United States Patent and Trademark Office*